United States Patent
Downs

(10) Patent No.: US 10,012,667 B2
(45) Date of Patent: Jul. 3, 2018

(54) METHODS AND SYSTEMS FOR AIRBORNE VEHICLE WIND DEPICTION

(71) Applicant: THE BOEING COMPANY, Huntington Beach, CA (US)

(72) Inventor: Joshua Lee Downs, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 843 days.

(21) Appl. No.: 14/515,850

(22) Filed: Oct. 16, 2014

(65) Prior Publication Data

US 2016/0109475 A1 Apr. 21, 2016

(51) Int. Cl.
*G01C 23/00* (2006.01)
*G01P 5/00* (2006.01)
*G01P 13/02* (2006.01)

(52) U.S. Cl.
CPC .............. *G01P 5/00* (2013.01); *G01P 13/025* (2013.01)

(58) Field of Classification Search
USPC ............................................................ 701/3
See application file for complete search history.

(56) References Cited

U.S. PATENT DOCUMENTS

| 7,471,214 | B2 | 12/2008 | Feyereisen et al. | |
| 7,980,512 | B1* | 7/2011 | Speer | B64D 39/00 244/135 A |
| 8,781,650 | B2 | 7/2014 | Downs | |
| 8,977,481 | B1* | 3/2015 | Downs | G08G 5/0017 701/120 |
| 2011/0098871 | A1 | 4/2011 | Buchanan et al. | |
| 2013/0270394 | A1* | 10/2013 | Downs | G05D 1/0027 244/76 R |
| 2016/0109475 | A1* | 4/2016 | Downs | G01P 5/00 702/142 |

* cited by examiner

*Primary Examiner* — Tyler Paige
(74) *Attorney, Agent, or Firm* — Armstrong Teasdale LLP

(57) ABSTRACT

Methods and systems for depicting a wind force exerted on an airborne vehicle are provided herein. The method includes receiving, by a processor, wind data measured by one or more airborne vehicles and position data associated with the one or more airborne vehicles. The method also includes generating, by the processor, a map display depicting a position of each of the one or more airborne vehicles based on the received position data. The method further includes generating a vehicle symbol on the map display for each of the one or more airborne vehicles. The vehicle symbol includes a vehicle indicator and a wind indicator. The wind indicator includes a symbol indicating a speed and a direction of wind exerted on the vehicle.

23 Claims, 8 Drawing Sheets

METHODS AND SYSTEMS FOR AIRBORNE VEHICLE WIND DEPICTION

BACKGROUND

This invention relates generally to airborne vehicles, and more particularly, to depicting wind force exerted on an airborne vehicle.

At least some known airborne vehicles have navigation displays for displaying information used by an operator to operate an airborne vehicle. Such navigation displays may display maps to an operator of the aircraft for use in operating the aircraft. In some cases, an operator may manage more than one airborne vehicle. For example, an operator may manage multiple unmanned aerial vehicles (UAVs). Because operators of UAVs are removed from the vehicle, operators do not physically experience accelerations caused by variations in wind. At least some navigation displays compensate for the lack of multi-sensory experience typically enjoyed by pilots of manned aircraft. Without some form of depiction of vehicle-specific vehicle-reported winds, the operator has a greater challenge in accurately planning time/fuel required, selecting approaches, and understanding certain reported states of the vehicle (e.g., significant discrepancy between heading and ground track, attitude upsets, variations in altitude and speed).

At least one known navigation display uses alphanumeric data displays and graphical arrows to display currently sensed wind direction and speed. Such methods typically use alphanumeric displays to depict the direction from which the wind is blowing and speed of the wind. A graphical depiction of the wind in the form of an arrow is often associated with the alphanumeric display, and indicates the direction to which the wind is blowing. Other types of displays address an impact of the wind on vehicle performance, such as a drift indicator in a navigation display. Windshear is often indicated via various graphical, text, and auditory display methods on the navigation display such that only awareness of the likely existence of windshear is provided for.

BRIEF DESCRIPTION

In one aspect, a method of depicting a wind force exerted on an airborne vehicle is provided. The method includes receiving, by a processor, wind data measured by one or more airborne vehicles and position data associated with the one or more airborne vehicles. The method also includes generating, by the processor, a map display depicting a position of each of the one or more airborne vehicles based on the received position data. The method further includes generating a vehicle symbol on the map display for each of the one or more airborne vehicles. The vehicle symbol includes a vehicle indicator and a wind indicator. The wind indicator includes a symbol indicating a speed and a direction of wind exerted on the vehicle.

In another aspect, a computing device for depicting a wind force exerted on an airborne vehicle is provided. The computing device is configured to receive wind data measured by one or more airborne vehicles and position data associated with the one or more airborne vehicles. The computing device is also configured to generate a map display depicting a position of the one or more airborne vehicles based on the received position data. The computing device is further configured to generate a vehicle symbol on the map display for each of the one or more airborne vehicles. The vehicle symbol includes a vehicle indicator and a wind indicator. The wind indicator includes a symbol indicating a speed and a direction of wind exerted on the airborne vehicle.

In yet another aspect, a computer-readable storage medium having computer-executable instructions embodied thereon for depicting a wind force exerted on an airborne vehicle is provided. When executed by a computing device having at least one processor, the computer-executable instructions cause the computing device to receive wind data measured by the airborne vehicle and position data associated with the airborne vehicle, and generate a map display depicting a position of the airborne vehicle based on the received position data. The computer-executable instructions further cause the computing device to generate a vehicle symbol on the map display. The vehicle symbol includes a vehicle indicator and a wind indicator. The wind indicator includes a symbol indicating a speed and a direction of wind exerted on the airborne vehicle.

The features, functions, and advantages that have been discussed can be achieved independently in various implementations or may be combined in yet other implementations further details of which can be seen with reference to the following description and drawings.

DETAILED DESCRIPTION

Figure 1:
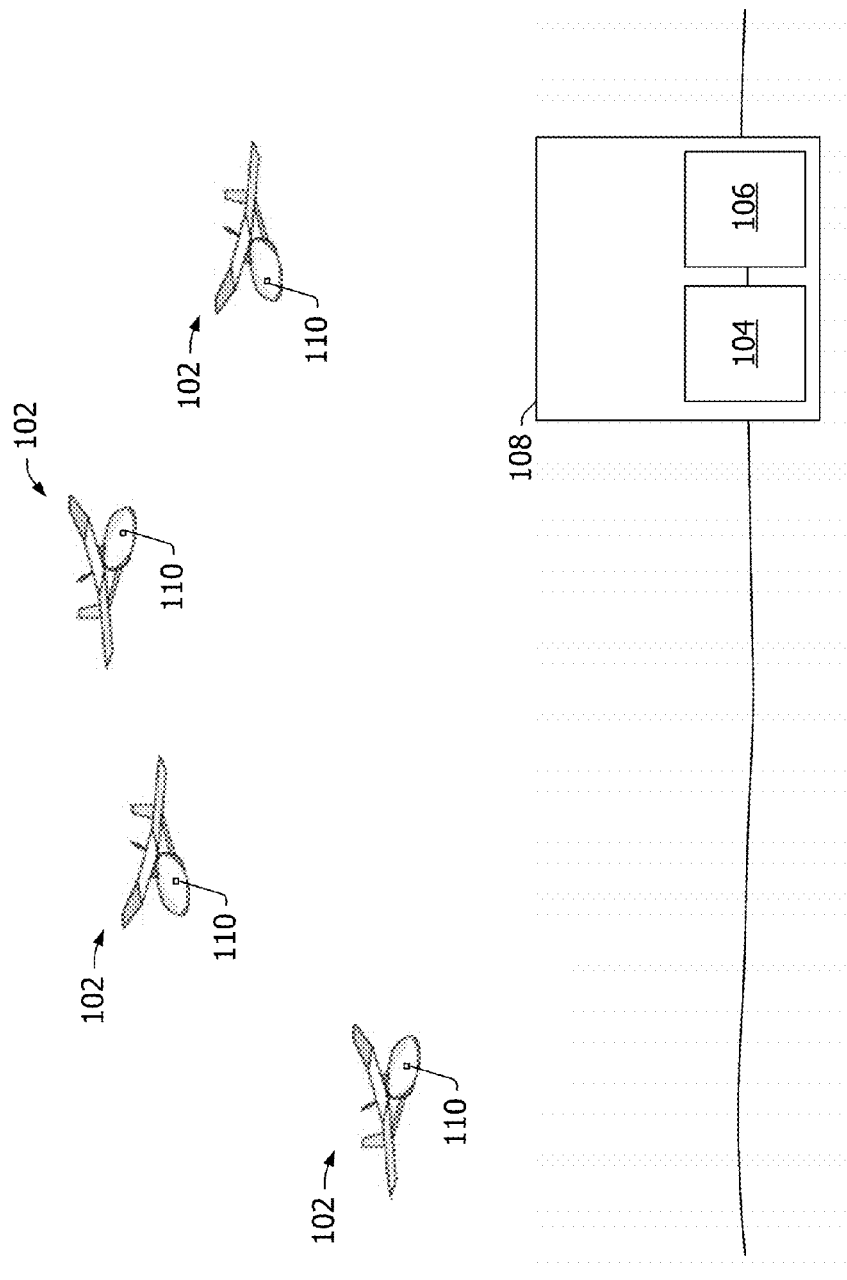
FIG. 1 is a block diagram of an aircraft environment.

FIG. 1 is a block diagram of an aircraft environment 100. In the exemplary implementation, aircraft environment 100 includes one or more airborne vehicles 102 and an airborne vehicle control system 104. Operation of airborne vehicles 102 is managed by an operator 106 using airborne vehicle control system 104 at a location 108. Location 108 may be, for example, without limitation, a ground location, an aircraft, a ship, or some other suitable location. In the exemplary implementation, airborne vehicles 102 are unmanned aerial vehicles. However, in other implementations, airborne vehicles 102 may include any type of airborne vehicle that enables aircraft environment 100 to function as described herein.

Airborne vehicle control system 104 enables operator 106 to manage operation of one or more airborne vehicles 102. For example, operator 106 may perform operations such as updating one or more of planned routes, initiating surveillance operations, dropping payloads, and/or other suitable operations. Airborne vehicle control system 104 communicates with airborne vehicles 102 to send and receive information for managing operation of airborne vehicles.

In the exemplary implementation, airborne vehicle control system 104 is further configured to depict a wind force exerted on one or more airborne vehicles 102. Each airborne vehicle 102 includes a sensor 110 that measures wind data for wind exerted on airborne vehicle 102. Wind data represents a magnitude and a direction of wind exerted on airborne vehicle 102. Airborne vehicle 102 communicates wind data to airborne vehicle control system 104 at predetermined time intervals. Airborne vehicle control system 104 displays a map depicting a vehicle symbol for each airborne vehicle 102 controlled by operator 106, and wind data associated with each airborne vehicle 102, as described in more detail herein.

Figure 2:
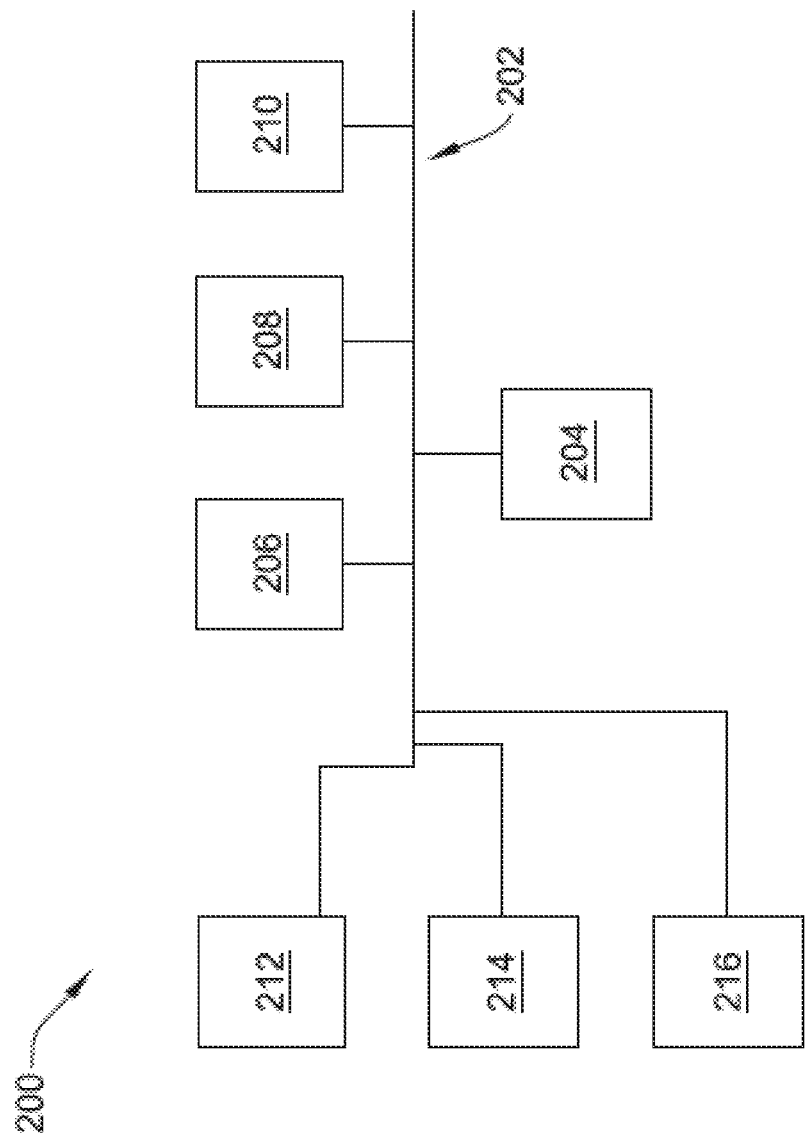
FIG. 2 is a block diagram of an example computing device that may depict a wind force exerted on one or more airborne vehicles.

FIG. 2 is a block diagram of an example computing device 200 that may depict a wind force exerted on one or more airborne vehicles 102. In the exemplary implementation, computing device is similar to airborne vehicle control system 104. Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive. In some implementations, storage device 210 includes wind data received from one or more airborne vehicles 102.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, a mouse, and/or a touch screen. Output device 214 may include a conventional mechanism that outputs information to a user, including a display (including a touch screen) and/or a speaker. Communication interface 216 may include any transceiver-like mechanism that enables computing device 200 to communicate with other devices and/or systems. For example, communication interface 216 may include mechanisms for communicating with one or more airborne vehicles 102 and/or another computing device.

As described herein, computing device 200 facilitates depicting a wind force exerted on one or more airborne vehicles 102. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
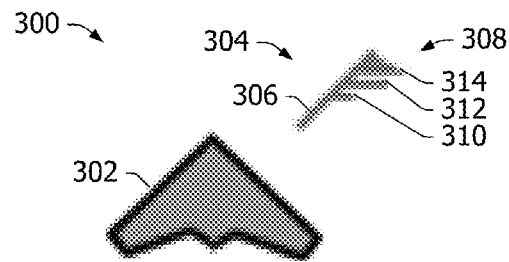
FIG. 3 is an illustration of an exemplary implementation of a vehicle symbol depicting a wind force exerted on an airborne vehicle.

FIG. 3 is an illustration of an exemplary implementation of a vehicle symbol 300 depicting a wind force exerted on an airborne vehicle, such as airborne vehicle 102. In the exemplary implementation, vehicle symbol 300 is generated by computing device 200. Vehicle symbol 300 includes a vehicle indicator 302 and a wind indicator 304. Vehicle indicator 302 is a symbol associated with a type or model of airborne vehicle 102 being depicted.

Wind indicator 304 includes a symbol indicating a speed and a direction of wind exerted on airborne vehicle 102. In the exemplary implementation, wind indicator 304 includes a shaft 306 extending radially outward from vehicle indicator 302. A direction of shaft 306 represents a direction of the wind on airborne vehicle 102. For example, as shown in FIG. 3, airborne vehicle 102 is travelling toward 360 degrees on a 0 to 360 degree directional scale, and the wind represented by shaft 306 is incoming from about 45 degrees.

Wind indicator 304 also includes at least one barb 308 coupled to shaft 306. Barb 308 represents a speed of the wind. A length and a shape of at least one barb 308 indicate different values of wind speed. For example, barb 308 may include a short, straight barb 310, a long, straight barb 312, and/or a triangular barb 314. Short, straight barb 310 represents a wind speed of 5 knots, long, straight barb 312 represents a wind speed of 10 knots, and triangular barb 314 represents a wind speed of 50 knots. In the exemplary implementation, a length of short, straight barb 310 is adjusted to represent any wind speed from about 1 to 10 knots. In the implementation shown in FIG. 3, wind indicator 304 includes a short, straight barb 310, a long, straight barb 312, and a triangular barb 314, which represent a wind speed of 65 knots. However, any number of barbs 308 may be used to indicate wind speed.

Figure 4:
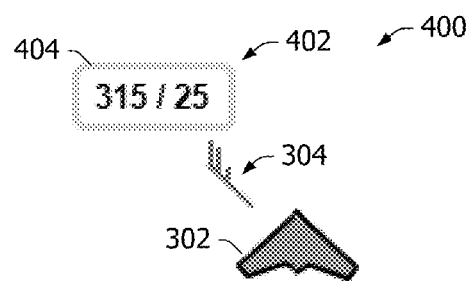
FIG. 4 is an illustration of an exemplary implementation of a vehicle symbol including a data tag.

FIG. 4 is an illustration of an exemplary implementation of a vehicle symbol 400 including a data tag 402. In the exemplary implementation, vehicle symbol 400 includes similar features as vehicle symbol 300 (shown in FIG. 3) that will not be described with reference to FIG. 4. Vehicle symbol 400 further includes data tag 402 adjacent wind indicator 304. Data tag 402 includes an alphanumeric display 404 depicting the wind speed and/or the wind direction indicated by wind indicator 304. For example, as shown in FIG. 4, data tag 402 depicts a wind direction of 315 degrees and a wind speed of 25 knots. Data tag 402 is displayed when operator 106 positions input device 212 over vehicle symbol 300. When operator 106 removes input device 212 from vehicle symbol 300, data tag 402 disappears.

Figure 5:
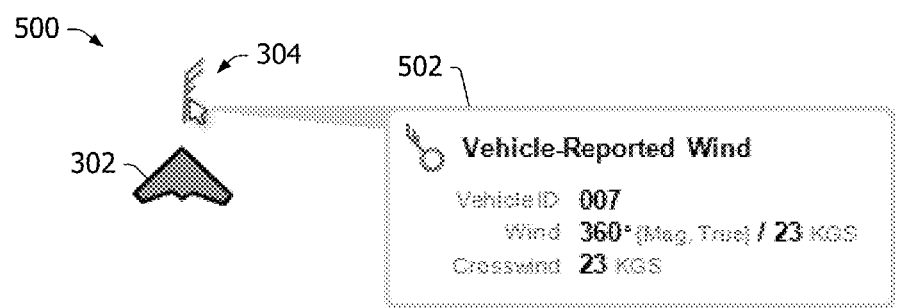
FIG. 5 is an illustration of an exemplary implementation of a vehicle symbol including a sampled data block.

FIG. 5 is an illustration of an exemplary implementation of a vehicle symbol 500 including a sampled data block 502. In the exemplary implementation, vehicle symbol 500 includes similar features as vehicle symbol 300 (shown in FIG. 3) that will not be described with reference to FIG. 5. Vehicle symbol 500 further includes sampled data block 502 adjacent to wind indicator 304. Sampled data block 502 includes information including a vehicle identifier, the wind speed, the wind direction, and/or a crosswind exerted on airborne vehicle 102. Sampled data block 502 is displayed when operator 106 selects vehicle symbol 300 using input device 212.

Figure 6:
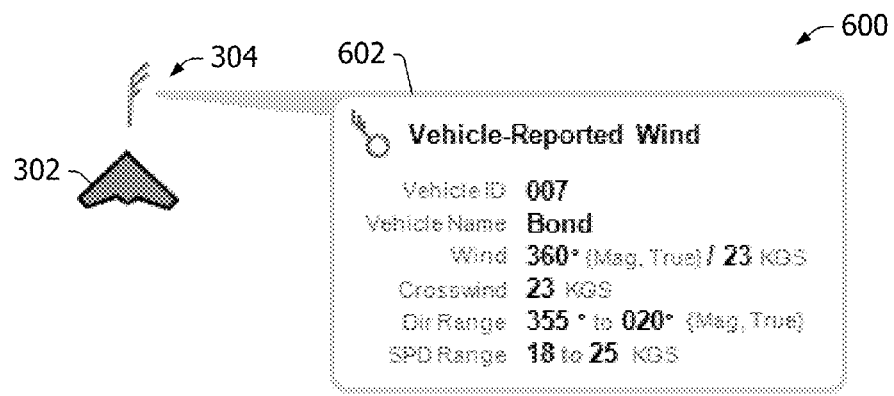
FIG. 6 is an illustration of an exemplary implementation of a vehicle symbol including a selected data block.

FIG. 6 is an illustration of an exemplary implementation of a vehicle symbol 600 including a selected data block 602. In the exemplary implementation, vehicle symbol 600 includes similar features as vehicle symbol 300 (shown in FIG. 3) and vehicle symbol 500 (shown in FIG. 5) that will not be described with reference to FIG. 6. Vehicle symbol 600 further includes selected data block 602 adjacent to wind indicator 304. In addition to the information displayed in sampled data block 502 (shown in FIG. 5), selected data block 602 includes a range of wind directions over a specified period of time. For example, in the exemplary implementation, selected data block 602 indicates that the wind direction has varied from 355 degrees to 20 degrees and the wind speed has varied from 18 knots to 25 knots over a specified time period (i.e., 1 hour).

Figure 7:
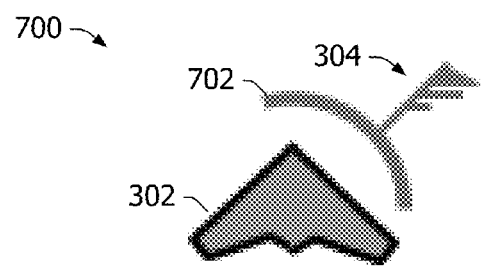
FIG. 7 is an illustration of an exemplary implementation of a vehicle symbol including a wind direction history indicator.

FIG. 7 is an illustration of an exemplary implementation of a vehicle symbol 700 including a wind direction history indicator 702. In the exemplary implementation, vehicle symbol 700 includes similar features as vehicle symbol 300 (shown in FIG. 3) that will not be described with reference to FIG. 7. Vehicle symbol 700 further includes wind direction history indicator 702 that illustrates a history of wind direction measured by airborne vehicle 102. Wind direction history indicator 702 spans about vehicle indicator 302 to show the range of wind direction experience by airborne vehicle 102. In the implementation shown in FIG. 7, wind direction history indicator 702 indicates a wind direction history ranging from about 355 degrees to about 95 degrees.

Figure 8:
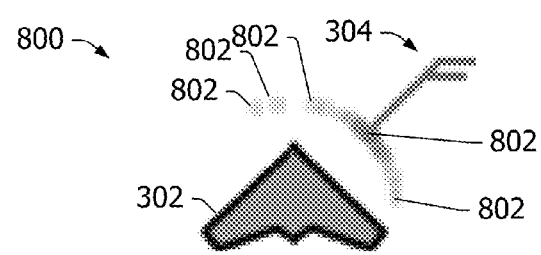
FIG. 8 is an illustration of an exemplary implementation of a vehicle symbol including a plurality of semi-transparent dots.

FIG. 8 is an illustration of an exemplary implementation of a vehicle symbol 800 including a plurality of semi-transparent dots 802 used to depict distribution of the vehicle-reported wind directions. In the exemplary implementation, vehicle symbol 800 includes similar features as vehicle symbol 300 (shown in FIG. 3) that will not be described with reference to FIG. 8. Vehicle symbol 800 further includes semi-transparent dots 802 that indicate a wind direction distribution. Each dot 802 represents a wind report for a specified period of time. As winds are reported from any given direction, dots 802 become progressively more opaque as more wind data are reported from those directions. In an alternative implementation, semi-transparent ticks may be used instead of semi-transparent dots. In some implementations, wind speed is incorporated into the wind distribution display by altering a size of dots 802.

Figure 9:
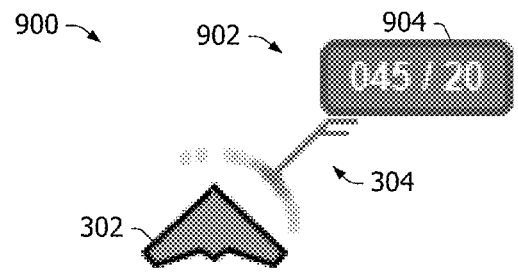
FIG. 9 is an illustration of an exemplary implementation of a vehicle symbol including a wind gust data tag.

FIG. 9 is an illustration of an exemplary implementation of a vehicle symbol 900 including a wind gust data tag 902. In the exemplary implementation, vehicle symbol 900 includes similar features as vehicle symbol 300 (shown in FIG. 3) that will not be described with reference to FIG. 9. Vehicle symbol 900 further includes wind gust data tag 902 adjacent to wind indicator 304 when airborne vehicle 102 measures a wind gust. Wind gust data tag 902 includes an alphanumeric display 904 depicting the latest wind direction and wind speed reported by airborne vehicle 102. In the exemplary implementation, wind gust data tag 902 is color coded to draw the attention of operator 106. For example, wind gust data tag 902 may be illustrated in the color red so that it stands out relative to other vehicle symbols 300 on a map display. Moreover, in the exemplary implementation, wind gust data tag 902 is automatically displayed when the measure wind speed exceeds a predetermined threshold.

Figure 10:
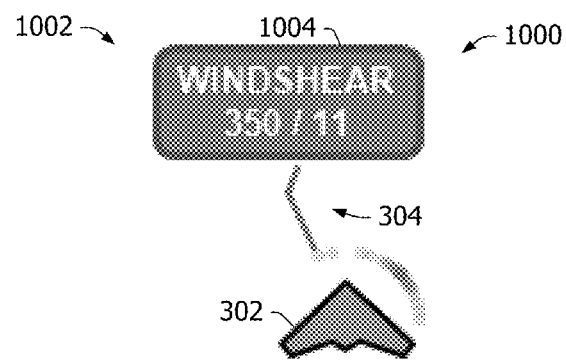
FIG. 10 is an illustration of an exemplary implementation of a vehicle symbol including a windshear data tag.

FIG. 10 is an illustration of an exemplary implementation of a vehicle symbol 1000 including a windshear data tag 1002. In the exemplary implementation, vehicle symbol 1000 includes similar features as vehicle symbol 300 (shown in FIG. 3) that will not be described with reference to FIG. 10. Vehicle symbol 1000 further includes a color-coded windshear data tag 1002 adjacent to wind indicator 304 when airborne vehicle 102 measures a windshear. Windshear data tag 1002 includes alphanumeric display 1004 depicting a windshear warning, the latest wind direction, and the latest wind speed reported by airborne vehicle 102. In alternative implementations, alphanumeric display 1004 further depicts a vertical rate of airborne vehicle 102, airspace deviations, and/or lateral deviations. In the exemplary implementation, windshear data tag 1002 is color coded to draw the attention of operator 106. For example, windshear data tag 1002 may be illustrated in the color red so that it stands out relative to other vehicle symbols 300 on a map display. Moreover, in the exemplary implementation, windshear data tag 1002 is automatically displayed when the measure wind speed exceeds a predetermined threshold.

Figure 11:
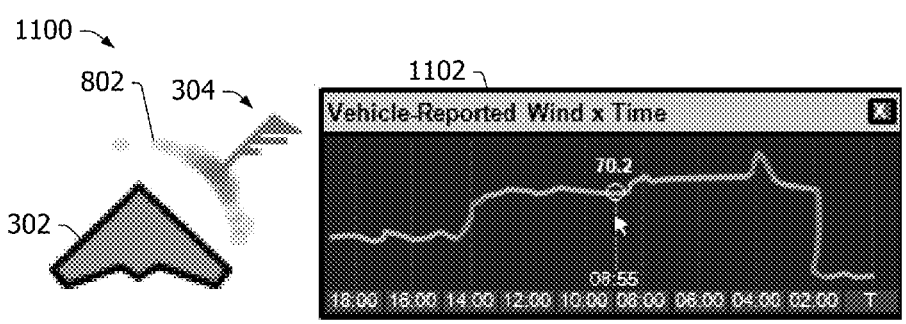
FIG. 11 is an illustration of an exemplary implementation of a vehicle symbol including a strip chart.

FIG. 11 is an illustration of an exemplary implementation of a vehicle symbol 1100 including a strip chart 1102. In the exemplary implementation, vehicle symbol 1100 includes similar features as vehicle symbol 300 (shown in FIG. 3) that will not be described with reference to FIG. 11. Vehicle symbol 1100 further includes strip chart 1102 that depicts history and distributions of wind data. Strip chart 1102 is called up next to vehicle symbol 1100 or is displayed in a dedicated display window. In the exemplary implementation, strip chart 1102 shows wind speed by time displayed beside vehicle symbol 1100 and associated reported wind data. Other parameters may be displayed in strip chart 1102 include, but are not limited to, wind direction by time, headwind by time, crosswind by time, wind speed by altitude, wind direction by altitude, headwind by altitude, and/or crosswind by altitude. The parameters to be displayed are selected by operator 106. In an alternative implementation, strip chart 1102 may be a radial plot.

Figure 12:
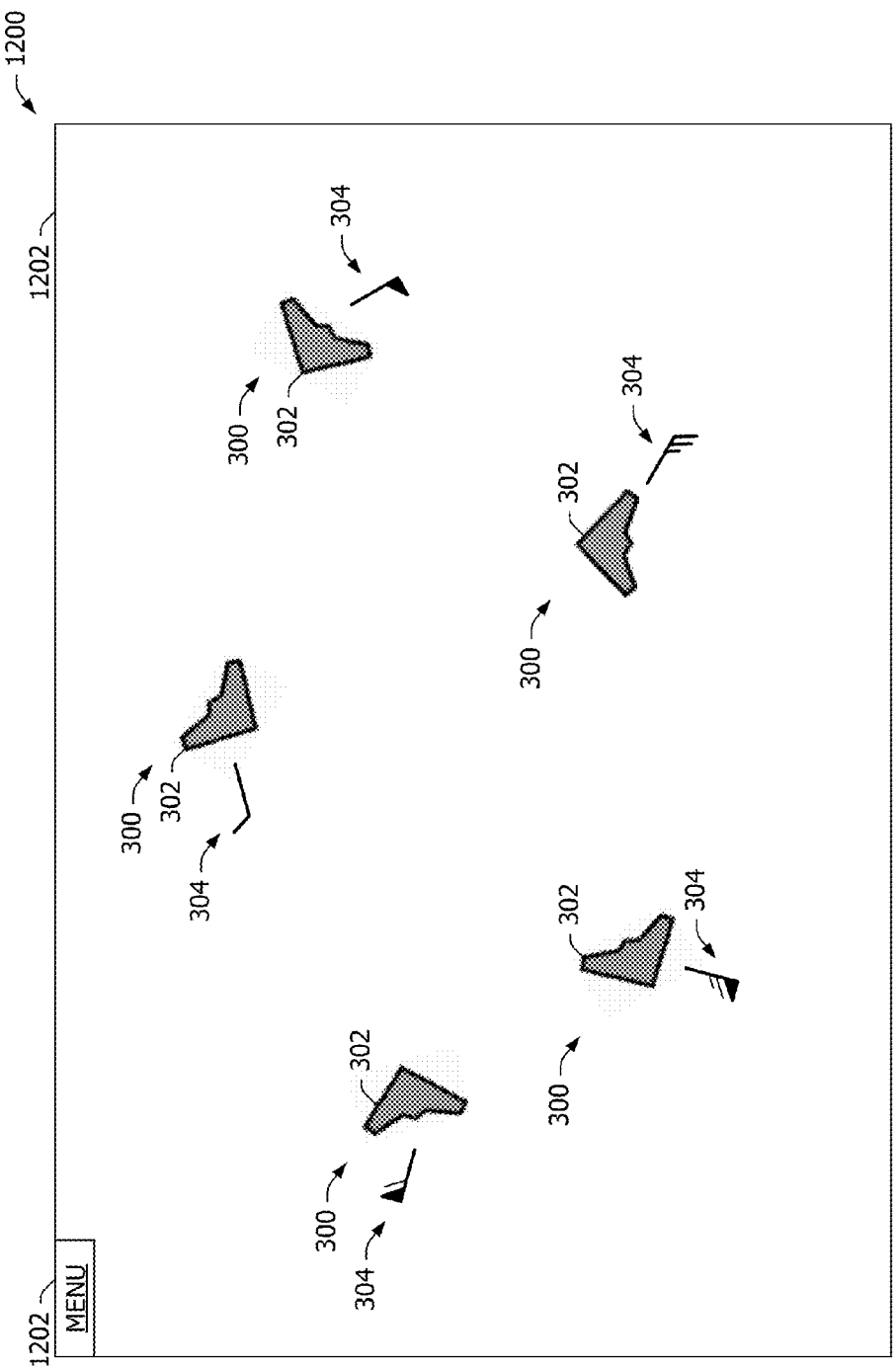
FIG. 12 is an exemplary implementation of a map display depicting a plurality of vehicle symbols.

FIG. 12 is an exemplary implementation of a map display 1200 depicting a plurality of vehicle symbols 300. Map display 1200 is displayed to operator 106 on output device 214. Each vehicle symbol 300 includes vehicle indicator 302 and wind indicator 304, as described in FIG. 2. In the exemplary implementation, operator 106 may interact with any of vehicle symbols 300 to view additional information relating to that particular airborne vehicle 102 and/or the wind data exerted on it. Upon selection of a vehicle symbol 300 by operator 106 using input device 212, a dropdown menu 1202 is displayed on map display 1200. Dropdown menu 1202 includes various display options available to operator 106. For example, dropdown menu 1202 includes options including the various types of vehicle symbols described in FIGS. 5-11.

Figure 13:
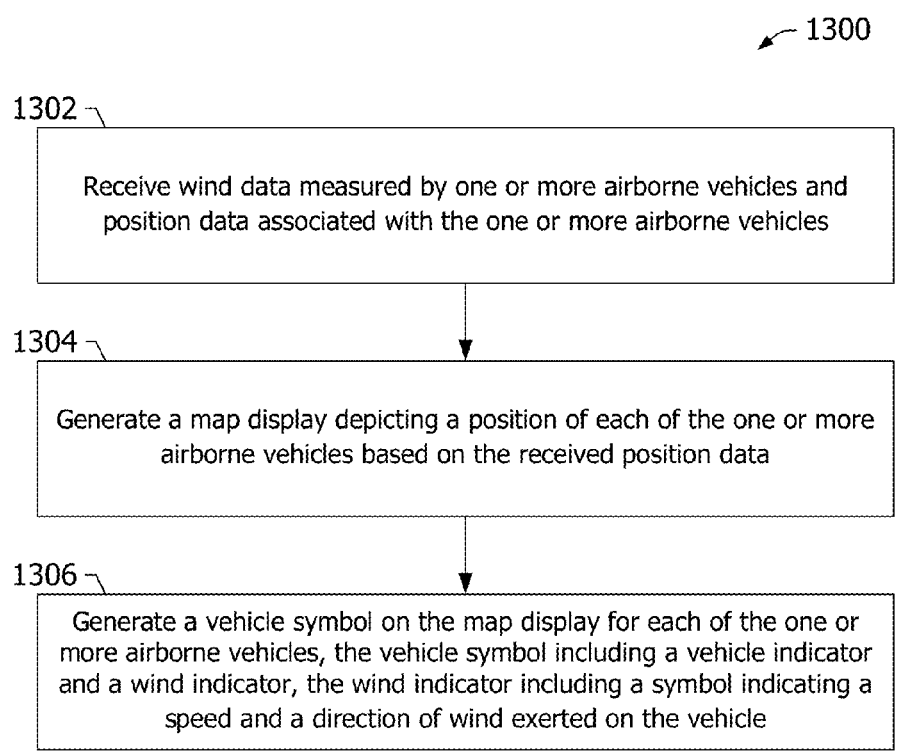
FIG. 13 is a flow chart of a process that may be performed by the computing device shown in FIG. 2 for depicting a wind force exerted on an airborne vehicle.

FIG. 13 is a flow chart of a process 1300 that may be performed by computing device 200 (shown in FIG. 2) for depicting a wind force exerted on an airborne vehicle. Initially, processor 204 of computing device 200 receives 1302 wind data measured by one or more airborne vehicles 102. The wind data includes at least a speed and a direction of wind acting on each airborne vehicle 102. Processor 204 also receives 1302 position data associated with each airborne vehicle 102. The position data represents a geographic location of airborne vehicle 102 and may include, but is not limited to including, GPS coordinates. In some implementations, processor stores the wind data and position data in storage device 210.

Based on the position data received from each airborne vehicle 102, processor 204 generates 1304 a map display 1200 depicting airborne vehicles 102. In some implementations, map display 1200 appears as an aeronautical chart and displays geographic markers, such as terrain. Because a plurality of airborne vehicles 102 are being depicted, map display 120 is displayed in a "North up" view, where the top of map display 1200 is aligned with a North direction and aircraft symbols 300 are displayed at an angle of direction relative to North. In some implementations, when a particular aircraft symbol 300 is selected by operator 106, map display 1200 may be displayed in a "heading up" mode for that particular aircraft symbol 300.

Processor 204 then generates 1306 vehicle symbols 300 on map display 1200 for each airborne vehicle 102. Each vehicle symbol 300 includes vehicle indicator 302 and wind indicator 304. Wind indicator 304 includes a symbol indicating a speed and a direction of wind exerted on airborne vehicle 102.

Figure 14:
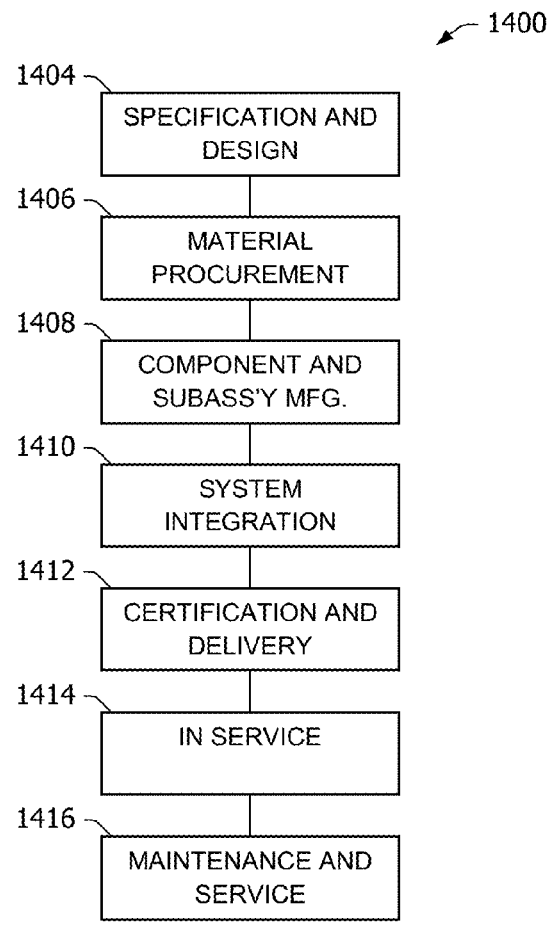
FIG. 14 is a flow diagram of an exemplary aircraft production and service methodology.
Figure 15:
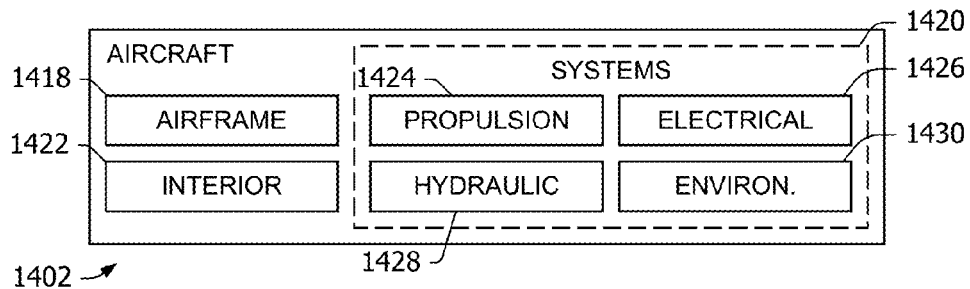
FIG. 15 is a block diagram of an exemplary aircraft.

Referring to the drawings, implementations of the disclosure may be described in the context of an aircraft manufacturing and service method 1400 (shown in FIG. 14) and via an aircraft 1402 (shown in FIG. 15). During pre-production, including specification and design 1404 data of aircraft 1402 may be used during the manufacturing process and other materials associated with the airframe may be procured 1406. During production, component and subassembly manufacturing 1408 and system integration 1410 of the aircraft 1402 occurs, prior to aircraft 1402 entering its certification and delivery process 1412. Upon successful satisfaction and completion of airframe certification, aircraft 1402 may be placed in service 1414. While in service by a customer, aircraft 1402 is scheduled for periodic, routine, and scheduled maintenance and service 1416, including any modification, reconfiguration, and/or refurbishment, for example.

Each portion and process associated with aircraft manufacturing and/or service 1400 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, an aircraft 1402 produced via method 1400 may include an airframe 1418 having a plurality of systems 1420 and an interior 1422. Examples of high-level systems 1420 include one or more of a propulsion system 1424, an electrical system 1426, a hydraulic system 1428, and/or an environmental system 1430. Any number of other systems may be included. Although an aircraft example is shown, the principles of the invention may be applied to non-aviation industries, such as the automotive industry.

Systems and methods embodied herein may be employed during any one or more of the stages of method 1400. For example, components or subassemblies corresponding to component production process 1408 may be fabricated or manufactured in a manner similar to components or subassemblies produced while aircraft 1402 is in service. Also, one or more system implementations, method implementations, or a combination thereof may be utilized during the production stages 1408 and 1410, for example, by substantially expediting assembly of, and/or reducing the cost of assembly of aircraft 1402. Similarly, one or more of system implementations, method implementations, or a combination thereof may be utilized while aircraft 1402 is being serviced or maintained, for example, during scheduled maintenance and service 1416.

The methods and systems described herein provide a technical effect of enabling an operator to be presented with more information for use in navigating a plurality of airborne vehicles. An exemplary technical effect of the methods and systems described herein includes at least one of: (a) receiving, by a processor, wind data measured by one or more airborne vehicles and position data associated with the one or more airborne vehicles; (b) generating, by the processor, a map display depicting a position of each of the one or more airborne vehicles based on the received position data; and (c) generating a vehicle symbol on the map display for each of the one or more airborne vehicles, the vehicle symbol including a vehicle indicator and a wind indicator, the wind indicator including a symbol indicating a speed and a direction of wind exerted on the vehicle.

The implementations described herein present vehicle-specific wind data via a map display, and present the wind data around the specific airborne vehicle reporting them. In addition to indicating the last-reported wind direction and speed, the implementations also provide for the display of history of wind direction and speed using a variety of methods, all associated directly with the display of the vehicle reporting the data on the map. A time interval for displaying history and distribution of vehicle-specific vehicle-reported wind data is adjustable by an operator. As compared to known systems for displaying windshear notifications, the above-described implementations provide for windshear notifications that include the wind direction and speed. Moreover, the implementations place these data around the vehicle symbol on the map for the vehicle reporting the data, and provides for the display of various alphanumeric data describing wind direction, speed, history, and distribution relative to the vehicle reporting them in a data block associated with the graphical depiction of the wind.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred implementations of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modems, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of depicting a wind force exerted on an airborne vehicle, said method comprising:
   receiving, by a processor, wind data measured by one or more airborne vehicles and position data associated with the one or more airborne vehicles, the wind data and the position data determined by at least one sensor onboard each respective airborne vehicle of the one or more airborne vehicles;
   generating, by the processor, a map display depicting a position of each of the one or more airborne vehicles based on the received position data, the map display generated on a display device communicatively coupled to the processor; and
   generating, by the processor on the display device, a vehicle symbol on the map display for each of the one or more airborne vehicles, the vehicle symbol including a vehicle indicator and a wind indicator, the wind indicator including a symbol indicating a speed and a direction of wind exerted on the vehicle.

2. The method of claim 1, wherein generating a vehicle symbol further comprises generating a wind indicator that includes a shaft extending radially outward from the vehicle symbol, wherein a direction of the shaft represents a direction of the wind.

3. The method of claim 2, wherein generating a vehicle symbol further comprises coupling at least one barb to the shaft, wherein at least one of a length and a shape of the at least one barb represents a speed of the wind.

4. The method of claim 2, wherein generating a vehicle symbol further comprises displaying, using the wind indicator, at least one of a wind direction history, a wind direction distribution over a specified period of time, and a wind magnitude.

5. The method of claim 4, further comprising displaying a graphical representation of the at least one of the wind direction history, the wind direction distribution over the specified period of time, and the wind magnitude.

6. The method of claim 1, further comprising displaying a data tag adjacent the wind indicator when an input device is positioned over the vehicle symbol on the map display, the data tag including an alphanumeric display depicting at least one of the wind speed and the wind direction exerted on the vehicle.

7. The method of claim 1, further comprising:
   receiving a selection of the vehicle symbol, the selection received from a display operator using an input device to select the vehicle symbol on the map display; and
   displaying a sampled data block adjacent to the wind indicator, the sampled data block including at least one of a vehicle identifier, the wind speed, the wind direction, and a crosswind exerted on the vehicle.

8. The method of claim 7, further comprising displaying a selected data block adjacent the wind indicator when the display operator activates a selected data block option on the map display, the selected data block including a range of wind directions over a specified period of time.

9. The method of claim 1, further comprising displaying a color-coded wind gust data tag adjacent to the wind indicator when the airborne vehicle measures a wind gust, the wind gust data tag including an alphanumeric display depicting the latest wind direction and wind speed reported by the airborne vehicle.

10. The method of claim 1, further comprising displaying a color-coded windshear data tag adjacent to the wind indicator when the airborne vehicle measures a windshear, the windshear data tag including an alphanumeric display depicting a windshear warning, the latest wind direction, and the latest wind speed reported by the airborne vehicle.

11. The method of claim 10, wherein the alphanumeric display further depicts at least one of a vertical rate of the airborne vehicle, airspace deviations, and lateral deviations.

12. The method of claim 1, further comprising:
   receiving, by the processor, wind data measured by a plurality of airborne vehicles and position data associated with each of the plurality of airborne vehicles;
   generating, by the processor, a map display depicting a position of each airborne vehicle relative to the plurality of airborne vehicles based on the received position data; and
   generating a plurality of vehicle symbols on the map display corresponding to each of the plurality of airborne vehicles, each of the plurality of vehicle symbols including a vehicle indicator and a wind indicator, the wind indicator including a symbol indicating a speed and a direction of wind exerted on the airborne vehicle, wherein the map display enables an operator to manage operation of one or more airborne vehicles including updating one or more planned routes.

13. A computing device for depicting a wind force exerted on an airborne vehicle, said computing device comprising a processor coupled to a memory device and a display device, said computing device configured to:
receive, by the processor, wind data measured by one or more airborne vehicles and position data associated with the one or more airborne vehicles, the wind data and the position data determined by at least one sensor onboard each respective airborne vehicle of the one or more airborne vehicles;
generate, by the processor, a map display depicting a position of the one or more airborne vehicles based on the received position data, the map display generated on the display device; and
generate, by the processor on the display device, a vehicle symbol on the map display for each of the one or more airborne vehicles, the vehicle symbol including a vehicle indicator and a wind indicator, the wind indicator including a symbol indicating a speed and a direction of wind exerted on the airborne vehicle.

14. The computing device of claim 13, further configured to:
generate a wind indicator that includes a shaft extending radially outward from the vehicle symbol, wherein a direction of the shaft represents a direction of the wind; and
couple at least one barb to the shaft, wherein at least one of a length and a shape of the at least one barb represents a speed of the wind.

15. The computing device of claim 14, further configured to display, using the wind indicator, at least one of a wind direction history, a wind direction distribution over a specified period of time, and a wind magnitude.

16. The computing device of claim 13, further configured to display a data tag adjacent the wind indicator when an input device is positioned over the vehicle symbol on the map display, the data tag including an alphanumeric display depicting at least one of the wind speed and the wind direction exerted on the airborne vehicle.

17. The computing device of claim 13, further configured to:
receive a selection of the vehicle symbol, the selection received from a display operator using an input device to select the vehicle symbol on the map display; and
display a sampled data block adjacent to the wind indicator, the sampled data block including at least one of a vehicle identifier, the wind speed, the wind direction, and a crosswind exerted on the airborne vehicle.

18. The computing device of claim 13, further configured to display a color-coded wind gust data tag adjacent to the wind indicator when the vehicle measures a wind gust, the wind gust data tag including an alphanumeric display depicting the latest wind direction and wind speed reported by the airborne vehicle.

19. The computing device of claim 13, further configured to:
receive wind data measured by a plurality of airborne vehicles and position data associated with each of the plurality of airborne vehicles;
generate a map display depicting a position of each airborne vehicle relative to the plurality of airborne vehicles based on the received position data; and
generate a plurality of vehicle symbols on the map display, each of the plurality of vehicle symbols including a vehicle indicator and a wind indicator, the wind indicator including a symbol indicating a speed and a direction of wind exerted on the airborne vehicle.

20. A non-transitory computer-readable storage medium having computer-executable instructions embodied thereon for depicting a wind force exerted on an airborne vehicle, wherein when executed by a computing device having at least one processor, the computer-executable instructions cause the computing device to:
receive, by the processor, wind data measured by the airborne vehicle and position data associated with the airborne vehicle, the wind data and the position data determined by at least one sensor onboard each respective airborne vehicle of the one or more airborne vehicles;
generate a map display depicting a position of the airborne vehicle based on the received position data, the map display generated on a display device communicatively coupled to the processor; and
generate, by the processor on the display device, a vehicle symbol on the map display, the vehicle symbol including a vehicle indicator and a wind indicator, the wind indicator including a symbol indicating a speed and a direction of wind exerted on the airborne vehicle.

21. The non-transitory computer-readable storage medium of claim 20, wherein said computer-executable instructions further cause the computing device to:
generate a wind indicator that includes a shaft extending radially outward from the vehicle symbol, wherein a direction of the shaft represents a direction of the wind; and
couple at least one barb to the shaft, wherein at least one of a length and a shape of the at least one barb represents a speed of the wind.

22. The non-transitory computer-readable storage medium of claim 20, wherein said computer-executable instructions further cause the computing device to display a color-coded wind gust data tag adjacent to the wind indicator when the vehicle measures a wind gust, the wind gust data tag including an alphanumeric display depicting the latest wind direction and wind speed reported by the airborne vehicle.

23. The non-transitory computer-readable storage medium of claim 20, wherein said computer-executable instructions further cause the computing device to display a color-coded windshear data tag adjacent to the wind indicator when the vehicle measures a windshear, the windshear data tag including an alphanumeric display depicting a windshear warning, the latest wind direction, and the latest wind speed reported by the airborne vehicle.

* * * * *